(12) United States Patent
Jarvis et al.

(10) Patent No.: US 7,647,463 B2
(45) Date of Patent: Jan. 12, 2010

(54) APPARATUS, SYSTEM AND METHOD FOR DETECTION OF MISMATCHES IN CONTINUOUS REMOTE COPY USING METADATA

(75) Inventors: Thomas Charles Jarvis, Tucson, AZ (US); Beth Ann Peterson, Tucson, AZ (US); Warren Keith Stanley, Loveland, CO (US); Kenneth Wayne Todd, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 414 days.

(21) Appl. No.: 11/560,718

(22) Filed: Nov. 16, 2006

(65) Prior Publication Data

US 2008/0120482 A1    May 22, 2008

(51) Int. Cl.
*G06F 12/00* (2006.01)
(52) U.S. Cl. ............... 711/162; 711/112; 711/114; 711/161; 711/165; 707/204; 714/6
(58) Field of Classification Search ........... 711/112, 711/114, 161–162, 165; 714/6, 8, 42; 707/204
See application file for complete search history.

(56) References Cited

U.S. PATENT DOCUMENTS

| 6,351,792 | B1 | 2/2002 | Milillo | ............... 711/162 |
| 6,611,901 | B1 | 8/2003 | Micka et al. | |
| 6,823,436 | B2 | 11/2004 | Krishnamurthy | ............ 711/170 |
| 6,832,290 | B2 | 12/2004 | Todd | ..................... 711/113 |
| 6,996,688 | B2 * | 2/2006 | Factor et al. | ............. 711/162 |
| 2003/0126387 | A1 | 7/2003 | Watanabe | |
| 2004/0181640 | A1 | 9/2004 | Factor et al. | |
| 2004/0260870 | A1 | 12/2004 | Factor et al. | |

* cited by examiner

*Primary Examiner*—Jasmine Song
(74) *Attorney, Agent, or Firm*—Kunzler & McKenzie

(57) ABSTRACT

An apparatus, system, and method are disclosed for detecting mismatches in a mirror volume. A receive module receives a start indicator from a primary storage system. The start indicator includes a starting location of a first block to be modified on a track in a secondary storage system. The first block corresponds to an identically located first block of a modified record in the primary storage system. The tracks the first blocks on the primary and secondary storage systems each comprise irregular count key data ("CKD") tracks. A compare module compares the first block location indicated by the start indicator with block locations listed in track metadata. The track metadata describes user records on the irregular CKD tracks of the secondary storage system. An alert module generates an alert in response to the first block not aligning with a beginning block of a record on the secondary storage system.

20 Claims, 7 Drawing Sheets

APPARATUS, SYSTEM AND METHOD FOR DETECTION OF MISMATCHES IN CONTINUOUS REMOTE COPY USING METADATA

BACKGROUND OF THE INVENTION

1. Field of the Invention

This invention relates to detecting mismatches in mirror volumes and more particularly relates to detecting mismatches in mirror volumes of data storage devices containing count key data ("CKD") tracks with variable-length records.

2. Description of the Related Art

Often sensitive data requires data storage systems with a high degree of reliability. Computing systems often include a primary system for storing data from hosts and a secondary system that includes a backup copy of the primary storage system's data. A mirror volume typically provides a backup copy of data that is intended to be identical to a primary volume's data and may be used in place of the primary volume in case of failure or may be used as a source of data to re-initialize a primary volume with the backup data. Peer-to-peer remote copy ("PPRC") is a protocol used to mirror data on a secondary storage volume, typically at a remote site. The IBM Global Mirror, Global Copy, and Metro Mirror products are examples of peer-to-peer remote copy protocols.

When a PPRC or other mirror volume is initialized, a system may include an option to bypass making an initial copy of data on the secondary storage system when a system administrator believes that the secondary storage system contains a current copy of the primary volume to be mirrored. If the mirror volume on the secondary storage system is a complete copy of the primary volume on the primary storage system, after the system is initialized, the mirror volume may be kept current by copying updates to the secondary as the updates are copied to the primary. If, however, the mirror volume is initialized without receiving an initial copy of the primary volume and the mirror volume is not an identical copy of the primary volume, updates to the mirror volume may cause data corruption and other system errors. An update may include one or more files or may include only a portion of one or more files that have changed. A file or update may include one or more records.

Corrupt data may be a problem if updates are copied to data tracks on the mirror volume and the updates don't align with record boundaries. For example, if a computing system includes tracks formatted using CKD tracks with variable-length records and the primary and mirror volumes are not identical, an update to a particular record or group of records on the primary volume may not align with records on the mirror volume. Copying the update to the mirror volume would corrupt records on the mirror volume copied over by the update and would cause errors. The errors caused by the mismatch of data on the primary and mirror volumes may be severe and may require the secondary system to be unavailable or to reboot, and is very undesirable in a system requiring high reliability.

The TotalStorage DS8000 series (model 2107), DS6000 series (model 1750), and Enterprise Storage Server ("ESS") (model 2105) storage systems from IBM are all examples of systems with data storage devices, such as hard disk drives, formatted using CKD tracks with variable-length records. IBM's Fiber Connectivity ("FICON") and Enterprise System Connection ("ESCON") protocols are examples of protocols that use CKD tracks with variable length records. IBM's system Z and system 390 computers are examples of processors that use FICON and ESCON protocols to talk to CKD tracks with variable length records. Hard disk drives with CKD tracks differ from typical fixed block length tracks commonly in use today in that the CKD tracks may have records with lengths defined by a user. Each record includes a count field, an optional key field, and an optional data field. A count field includes information about the length of the key field and data field of a record.

CKD tracks may be regular or irregular. A disk with regular tracks includes records with CKD fields that are the same length for each record on the track. Regular tracks may be described by Track Format Descriptor ("TFD") metadata describing CKD field lengths assigned to a particular track. TFD metadata can be used to locate a particular record on a track. TFDs may also be sent along with an update and compared with TFDs on a secondary data system to determine if there is a mismatch of data format on primary and secondary storage systems. Typically a record occupies an integral number of sectors.

Irregular tracks contain records with CKD fields of varying length on a track. For example, an irregular CKD track may include one record of 4 sectors adjacent to another record of 6 sectors. Since each record in an irregular CKD track may be of a different length, a TFD is insufficient to describe the records because a TFD only describes one key field length and one data field length. For a regular CKD track, a TFD is sufficient because all key fields on the track are the same length and all data fields on the track are the same length. For an irregular CKD track, metadata that describes the field sizes for each record is used to describe record locations and sizes. The metadata may be in the form of a cache record control block ("CRCB") is placed in sector 0 of each track of a disk with irregular CKD tracks. Typically, record 0 is a fixed length, usually 48 bytes, and occupies a portion of sector 0 of each track. The CRCB is typically a table occupying an unused portion of sector 0 and contains information such as the starting sector and the size of the key and data fields of each record on the track.

The CRCB contains sufficient information to detect if a record on a primary volume aligns with a record on a mirror volume. However, transmitting a CRCB along with an update to a secondary storage system containing a mirror volume is undesirable due to the size of a CRCB and the related performance degradation caused by transmitting the CRCB. In addition, transmitting a CRCB may cause compatibility problems if, for example, a secondary storage system was not expecting a CRCB and received one along with an update.

SUMMARY OF THE INVENTION

From the foregoing discussion, a need exists for an apparatus, system, and method for detecting data volume mismatches for primary and secondary storage systems with irregular data tracks. Beneficially, such an apparatus, system, and method would provide an efficient means of determining if records contained in an update sent from a primary storage system to a secondary storage system are compatible with records at the location where the update is copied to the secondary storage system.

The present invention has been developed in response to the present state of the art, and in particular, in response to the problems and needs in the art that have not yet been fully solved by currently available data mismatch methods for irregular CKD tracks. Accordingly, the present invention has been developed to provide an apparatus, system, and method for detecting mismatches in a mirror volume that overcome many or all of the above-discussed shortcomings in the art.

The apparatus to detect mismatches in a mirror volume is provided with a plurality of modules configured to functionally execute the necessary steps of identifying a data mismatch and generating an alert. These modules in the described embodiments include a receive module that receives at a secondary storage system a start indicator from a primary storage system. The start indicator includes an indication of a location of a first block to be modified on a track of a data storage device in the secondary storage system. The first block of the secondary storage system corresponds to an identically located first block of at least one modified record on a track of a data storage device in the primary storage system. The tracks on the primary and secondary storage systems each include irregular count key data ("CKD") tracks.

The apparatus includes a compare module that compares the first block location indicated by the start indicator with block locations listed in track metadata where the track metadata describes lengths and locations of user records on the irregular CKD tracks of the secondary storage system. The apparatus includes an alert module that generates an alert in response to the first block indicated by the start indicator not aligning with a beginning block of a record on the secondary storage system, as indicated in the track metadata.

In one embodiment, the receive module also receives a block indicator from the primary storage system. The block indicator includes a quantity of blocks occupied by the at least one modified record of the primary storage system corresponding to an identical location of blocks on the secondary storage system to be modified. In the embodiment, the compare module further compares blocks to be modified on the secondary storage system, as indicated by the start indicator and the block indicator, with block locations listed in the track metadata. Also in the embodiment, the alert module further generates an alert in response to the ending block of the blocks to be modified on the secondary storage system, as indicated by the start indicator and the block indicator, not aligning with the ending block of a record on the secondary storage system, as indicated in the track metadata.

In one embodiment, the start indicator and the block indicator are included in a bitmap. In another embodiment, the quantity of blocks indicated by the block indicator further represents locations and quantities of non-contiguous blocks on the track of the data storage device of the secondary storage system corresponding to block locations for a plurality of modified records on the primary storage system to be copied to the secondary storage system, where the modified records are non-sequential. In another embodiment, a copy module is included to copy the at least one modified record on the primary storage system to an identical location on the secondary storage system in response to the alert module not generating an alert for a received start indicator corresponding to the modified records.

In one embodiment, a block is a sector, a cluster of sectors, a group of bytes, or a group of bits. In another embodiment, the track metadata comprises a cache record control block ("CRCB"). The apparatus is further configured, in one embodiment, to include a stop copy module that stops copying records to the data storage device in the secondary storage system in response to an alert generated by the alert module. In a further embodiment, the apparatus may be configured to include a notification module that sends a notification to the primary storage system in response to the alert. The notification includes a message to stop sending records to the secondary storage system.

A system of the present invention is also presented to detect mismatches in a mirror volume. The system may be embodied by a computer network, a primary storage system with at least one data storage device configured with irregular CKD tracks, and a secondary storage system in communication with the primary storage system over the computer network. The secondary storage system is configured to store a mirror copy of data on a data storage device of the primary storage system. The secondary storage system also includes at least one data storage device configured with irregular CKD tracks.

In particular, the secondary storage system, in one embodiment, includes a receive module that receives at the secondary storage system a start indicator from the primary storage system. The start indicator includes an indication of a location of a first block to be modified on a track of a data storage device with irregular CKD tracks in the secondary storage system. The first block of the secondary storage system corresponds to an identically located first block of at least one modified record on a track of a data storage device with irregular CKD tracks in the primary storage system.

The secondary system includes a compare module that compares the first block location indicated by the start indicator with block locations listed in track metadata. The track metadata describes lengths and locations of user records on the irregular CKD tracks of the secondary storage system. The secondary system includes an alert module that generates an alert in response to the first block indicated by the start indicator not aligning with a beginning block of a record on the secondary storage system, as indicated in the track metadata.

In one embodiment, the receive module also receives a block indicator from the primary storage system. The block indicator includes a quantity of blocks occupied by the at least one modified record of the primary system corresponding to an identical location of blocks on the secondary storage system to be modified. In the embodiment, the compare module further compares blocks to be modified on the secondary storage system, as indicated by the start indicator and the block indicator, with block locations listed in the track metadata. In the embodiment, the alert module further generates an alert in response to the ending block of the blocks to be modified on the secondary storage system, as indicated by the start indicator and the block indicator, not aligning with the ending block of a record on the secondary storage system, as indicated in the track metadata. In one embodiment, the primary and secondary storage systems are part of a peer-to-peer remote copy ("PPRC") system.

A method of the present invention is also presented for detecting mismatches in a mirror volume. The method in the disclosed embodiments substantially includes the steps necessary to carry out the functions presented above with respect to the operation of the described apparatus and system. In one embodiment, the method includes receiving at a secondary storage system a bitmap from a primary storage system. The bitmap includes bits correlating to sectors of at least one modified record on an irregular CKD track on the primary storage system. The at least one modified record is/are intended to be copied to an identical location on a corresponding irregular CKD track on the secondary storage system.

The method includes comparing the sector locations indicated in the bitmap to corresponding sector locations listed in a CRCB on the secondary storage system. The method includes generating an alert in response to the beginning sector of the at least one record, as indicated in the bitmap, not aligning with the beginning sector of a record on the secondary storage system, as indicated in the CRCB. In one embodiment, the method includes generating an alert in response to an ending sector of the at least one record, as indicated in the bitmap, not aligning with an ending sector of a record on the secondary storage system, as indicated in the CRCB.

In one embodiment, the method includes receiving a bitmap containing zeros and a starting sector location in an irregular CKD track as part of a write format command that erases data from the starting sector to the end of the track. Also, comparing the sector locations indicated in the bitmap to corresponding sector locations listed in the CRCB includes comparing the starting sector location to corresponding sector locations in the CRCB. In addition, generating an alert includes generating an alert in response to the starting sector not aligning with a beginning sector of a record on the secondary storage system, as indicated in the CRCB. In another embodiment, the method includes generating an error in response to the alert.

Another method of the present invention is also presented for detecting mismatches in a mirror volume. The method in the disclosed embodiments substantially includes the steps necessary to carry out the functions presented above with respect to the operation of the described apparatus and system. In one embodiment, the method includes generating a bitmap comprising bits correlating to sectors occupied by at least one record on an irregular CKD track on a primary storage system. The at least one record is intended to be copied to an identical location on an irregular CKD track of a secondary storage system. The method includes sending the bitmap to the secondary storage system.

The secondary storage system is configured to compare the sector locations indicated in the bitmap to corresponding sector locations listed in a CRCB on the secondary storage system and to generate an alert in response to a beginning sector of the at least one record, as indicated in the bitmap, not aligning with a beginning sector of a record on the secondary storage system, as indicated in the CRCB. In one embodiment, the secondary system is configured to generate an alert in response to an ending sector of the at least one record, as indicated in the bitmap, not aligning with an ending sector of a record on the secondary storage system, as indicated in the CRCB. In another embodiment, the method includes stopping sending copies of records to the secondary storage system in response to receiving a record mismatch notification from the secondary storage system.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
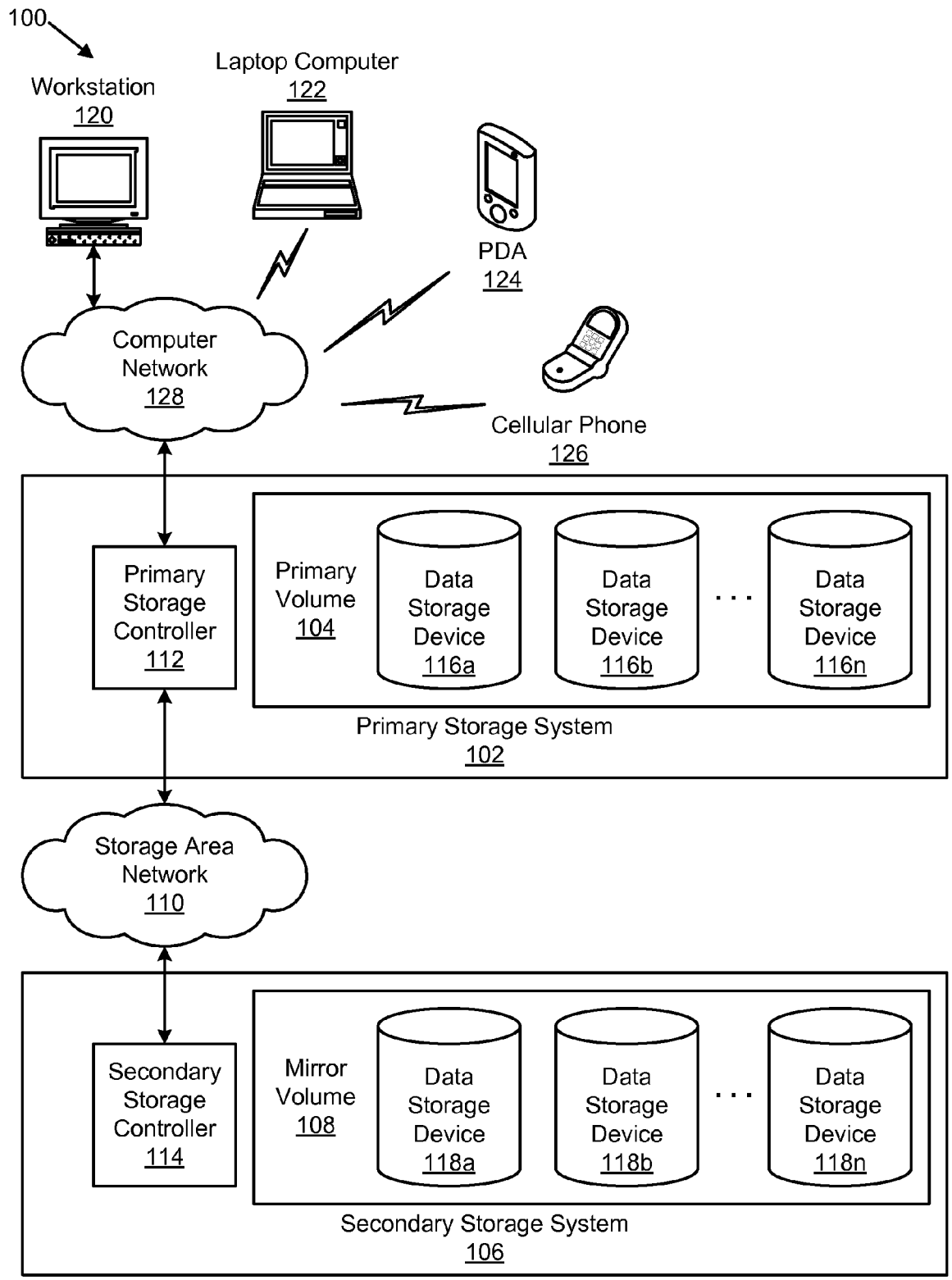
FIG. 1 is a schematic block diagram illustrating one embodiment of a system to detect data mismatches in a mirror volume in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 depicts one embodiment of a system 100 to detect data mismatches in a mirror volume in accordance with the present invention. The system includes a primary storage system 102 with a primary volume 104 in communication with a secondary storage system 106 with a mirror volume 108 over a storage area network 110. The primary storage system 102 includes a primary storage controller 112 and the secondary storage system 106 includes a secondary storage controller 114. The primary volume 104 includes one or more data storage devices 116 and the mirror volume 108 includes one or more data storage devices 118. The system 100 may include a workstation 120, a laptop computer 122, a personal digital assistant ("PDA") 124, or a cellular phone 126 in communication with the primary storage controller 112 over a computer network 128. Devices and components of the system 100 are described below.

The storage area network ("SAN") 110 may include a local area network ("LAN"), a wide area network ("WAN"), an optical fiber network, the Internet, etc. and may include a combination of networks. The SAN 110 includes, in one embodiment, a synchronous connection, where updates are stored on the primary and mirror volumes 104, 108 before success is registered for some form of a write operation. In another embodiment, the SAN 110 includes an asynchronous connection, where updates are stored on the primary volume 104 and then copied to the mirror volume 108 at a later time. In one embodiment, the SAN 110 is merged with the computer network 128 in communication with host devices. One of skill in the art will recognize other ways for a primary storage system 102 to communicate and send updates to a secondary storage system 106.

The primary storage system 102 includes a primary volume 104 that includes one or more data storage devices 116 with CKD tracks that include variable-length records. Typically one or more data storage devices 116 are combined to form a primary logical volume 104. The primary storage system 102 may include any number of logical volumes and each logical volume may include one or more data storage device 116. In one embodiment, the primary volume 104 includes a single data storage device 116a. In another embodiment, the primary storage volume 104 includes two or more data storage devices 116a, 116b, . . . 116n. In yet another embodiment, the primary storage volume 104 includes two or more data storage devices 116a, 116b, . . . 116n configured in a redundant array of inexpensive/independent disks ("RAID"). The data storage devices 116 of the primary volume 104 and of the primary storage system 102 may be external or internal to the primary storage controller 112 or other computer. The data storage devices 116 may be connected to the primary storage controller 112 through a SAN 110 or through another computer network. Internal data storage devices 116 may be connected to the primary storage controller 112 over a serial ATA bus, small computer system interface ("SCSI"), etc. One of skill in the art will recognize other configurations of a primary volume 104 capable of receiving updates.

The primary storage system 102 includes a primary storage controller 112, server, computer, etc. that stores updates from a host onto the primary volume 104. Typically, the primary storage controller 112 receives updates from a host over a computer network 128. A host may be a server (not shown), a workstation 120, a laptop computer 122, a PDA 124, a cellular phone 126, etc. Typically, the primary storage controller 112 communicates with a secondary storage controller 114 of a secondary storage system 106 to copy the received updates to the mirror volume 108. The primary storage controller 112 may include data movers, write cache, internal cache in the form of random access memory ("RAM"), or other devices to manage data of the primary storage system 102. One of skill in the art will recognize other primary storage controller 102 configurations that receive updates, copy the updates to a primary volume 104, and copy the updates to a mirror volume 108.

The secondary storage volume 106 includes a mirror volume 108 configured as a logical volume that includes one or more data storage devices 118 with CKD tracks with variable-length records. The mirror volume 108 is configured with one or more data storage devices 118 forming the volume and typically matches the configuration of the primary volume 104. The secondary storage system 106 may also include other data storage devices 118 configured as other logical volumes. The secondary storage volume 106 includes a secondary storage controller 114, server, computer, etc. configured to store updates received from the primary storage system 102 to the mirror volume 108. The secondary storage controller 114 may include data movers, write cache, internal cache in the form of RAM, or other devices to manage data of the secondary storage system 102. One of skill in the art will recognize other secondary storage controller 114 configurations that receive updates and copy the updates to a mirror volume 108.

Figure 2:
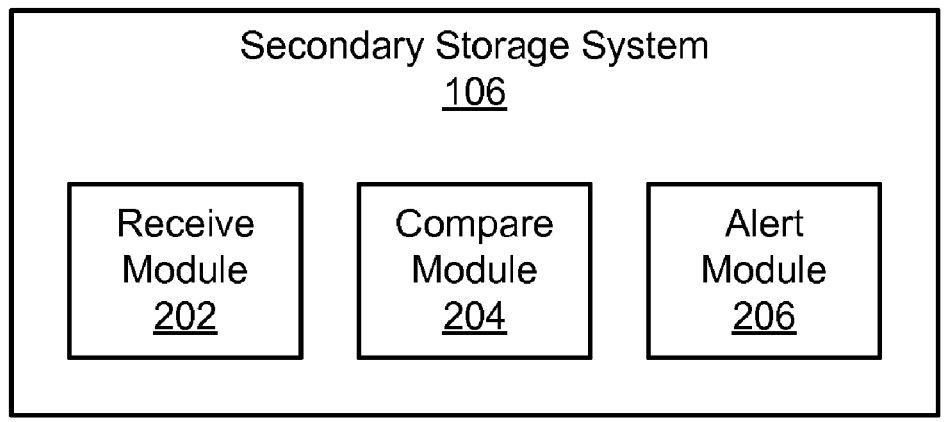
FIG. 2 is a schematic block diagram illustrating one embodiment of an apparatus associated with a secondary storage system to detect data mismatches in a mirror volume in accordance with the present invention.

FIG. 2 depicts one embodiment of an apparatus 200 associated with a secondary storage system 106 to detect data mismatches in a mirror volume 108 in accordance with the present invention. The apparatus 200 includes a secondary storage system 106 that includes a receive module 202, a compare module 204, and an alert module 206, which are described below. In one embodiment, the receive module 202, the compare module 204, and the alert module 206 are located in the secondary storage controller 114. In another embodiment, the receive module 202, the compare module 204, and the alert module 206 are located in a computer that is not part of the secondary storage system 106. In yet another embodiment, the modules 202, 204, 206 or portions of modules of the apparatus 200 are stored in various locations within the secondary storage system 106. One of skill in the art will recognize other locations that the modules 202, 204, 206 may be located.

The secondary storage system 106, in one embodiment, includes a receive module 202 that receives at a secondary storage system 106 a start indicator from a primary storage system 102. The start indicator typically includes an indication of a location of a first block to be modified on a track of a data storage device 118a in the secondary storage system 106. The first block of the secondary storage system 106 corresponds to an identically located first block of at least one modified record on a track of a data storage device 116a in the primary storage system 102. The tracks on the primary and secondary storage systems 102, 106 each include irregular CKD tracks.

In one embodiment, the receive module 202 also receives a block indicator from the primary storage system 102. The block indicator includes a quantity of blocks occupied by the at least one modified record of the primary storage system 102 corresponding to an identical location of blocks on the secondary storage system 106 to be modified. In one embodiment, the start indicator is a bit in a bitmap. In another embodiment, the start indicator is received separately from a bitmap. The block indicator, in another embodiment, is represented by bits in a bitmap. In other examples, the block indicator may be in the form of one or more integers, a table, or other data structure capable of conveying a quantity of blocks.

In a preferred embodiment, the start indicator and block indicator are included in a bitmap. For example, if bits in a bitmap represent blocks of an irregular CKD track, certain bits may represent a location of one or more records on an irregular CKD track of a primary storage system 102 that are to be copied to a secondary storage system 106. The first bit of the bitmap corresponding to the first block of the record to be copied may serve as the start indicator. Bits of the bitmap corresponding to sectors occupied by the one or more records to be copied to the secondary storage system 106 may serve as the block indicator.

The bitmap or other forms of a start indicator and block indicators may represent non-contiguous records of a track that are to be copied to the secondary storage system 106. For example, a bitmap may include "zeros" for blocks that do not correspond to records to be sent while "ones" in the bitmap may represent block locations for records to be copied to the secondary storage system 106. The records to be sent may include, for example, record 1 and record 3. Record 2 may be located between records 1 and 3. A bitmap representing the records to be sent may have a group of "ones" followed by a group of "zeros" which are followed by a group of "ones." The "ones" may represent blocks on the primary storage system 102 occupied by records 1 and 3.

Typically, records are sequentially numbered on a track, but may be numbered by any convenient method. In addition, typically a record spans a consecutive group of blocks or sectors on an irregular CKD track. In a preferred embodiment, a block is a sector and the terms are used interchangeably herein. However, in other embodiments a block may be a group of sectors, a group of bytes, a group of bits, etc. A start indicator may be any convenient way to convey where a record starts on a track. Similarly, a block indicator may be any measurement that conveys a quantity of standard units occupied by one or more records. One of skill in the art will recognize that a start indicator and a block indicator may represent any convenient group within a track and the apparatus, system and methods described herein are not limited to one particular embodiment of a block or sector.

The modified records generally are part of an update received at the primary storage system 102 for storage in the primary volume 104 and are copied to the secondary storage system 106 synchronously or asynchronously to the mirror volume 108. An update may be a new record, deletion of a record, or a change to an existing record. One of skill in the art will recognize other forms of a modified record on a primary volume 104 where the modified record or a change to a record may be copied, modified, or deleted from a secondary storage system 102 intended to be a mirror volume 108 of a primary volume 104.

Typically, the bitmap includes bits that correlate to sectors occupied by one or more modified records on the primary storage system 102. For example, if a modified record to be copied to a mirror volume 108 spans sectors 3-7 on a track, a bitmap accompanying the record would have "ones" in bits 3-7 and "zeros" in bits 0-2 as well as bits 8-$n$ where n is the number of sectors on the track. In another example, if a group of modified records spans sectors 8-22, the bitmap accompanying the records would have ones in bits 8-22 and zeros in bits 0-7 and 23-$n$. In yet another example, the bitmap is inverted to include "zeros" in bits corresponding to the received file and "ones" in other bits of the bitmap.

In one embodiment, the receive module 202 receives a single modified record or single group of modified records along with the start indicator. In another embodiment, the receive module receives the record(s) in addition to receiving a corresponding bitmap. In another embodiment, the receive module 202 receives an update that includes multiple records or groups of records, each having a corresponding bitmap or start/block indicators. In one embodiment, a bitmap includes bits representing more than one track. The bitmap may be in the form of a table. The table may include a portion of the tracks on a disk or all of the tracks on a disk. In another embodiment the receive module 202 receives multiple start indicators and block indicators for records on multiple tracks. One of skill in the art will recognize other bitmaps, start indicators, and block indicators and corresponding records that may be received by the receive module 202.

The secondary storage system 106, in one embodiment includes a compare module 204 that compares the first block location indicated by the start indicator with block locations listed in track metadata. The track metadata describes lengths and locations of user records on the irregular CKD tracks of the secondary storage system 106. For example, a received start indicator may indicate that a modified record of a primary volume 104 starts on block 3 and track metadata may indicate that a record on the mirror volume 108 also starts on block 2 and extends to block 4. In this case, the modified record on the primary volume 104 does not align with a record on the mirror volume 108.

In a preferred embodiment, the track metadata is included in a cache record control block ("CRCB") on the secondary storage system 106. The compare module 204, in another embodiment, compares sector locations indicated in a bitmap to corresponding sector locations listed in a CRCB. For example, a bitmap received by the receive module 202 corresponding to a modified record on the primary volume 104 may indicate that the modified record includes sectors 3-7. The compare module 204 compares the bitmap with the CRCB of the track where the record is to be copied. The CRCB may, for example, indicate that record 1 of the track occupies sectors 1 and 2, record 2 occupies sectors 3-7, and record 3 occupies sectors 8-10. In this case, the information from the bitmap compared with the CRCB indicates that the beginning and ending sectors of the received record align with the beginning and ending sectors of record 2.

In another example, the CRCB may indicate that record 1 of the track occupies sectors 1-4 and record 2 occupies sectors 5-10. In this case, comparing the bitmap with the CRCB reveals that the received record starts in the middle of record 1 and ends in the middle of record 2. If the received record is copied to the track, records 1 and 2 of the mirror volume 108 would be corrupted.

In another example, the receive module receives a bitmap representing non-contiguous modified records on the primary volume 104. For example, a received bitmap may indicate that one modified record occupies sectors 3-7 and another modified record occupies sectors 8-10. A CRCB corresponding to the irregular CKD track of the primary volume 104 represented by the bitmap may indicate that record 1 on the corresponding mirror volume 108 irregular CKD track occupies sectors 2-7 and record 2 occupies sectors 8-12. In this example, compare module 204 compares the bitmap and CRCB and the start of both modified records on the primary volume 104 do not align with records on the mirror volume 108. In one embodiment, the compare module 204 compares only the first record indicated in the bitmap with the CRCB. In another embodiment, the compare module 204 compares both records indicated in the bitmap with the CRCB.

The compare module 204, in one embodiment, also compares blocks to be modified on the secondary storage system 106, as indicated by the start indicator and the block indicator, with block locations listed in the track metadata. For example, the compare module 204 may use a start indicator to determine a starting block plus a block indicator as an offset to determine an ending block of a record or group of records. For example, if a start indicator indicates that a modified record on a primary volume 104 starts at block 2 and a block indicator indicates that the record spans 4 blocks, the compare module 204 may determine that the ending block of the record is block 5. If track metadata indicates that a record on the mirror volume 108 spans blocks 3-6, the ending block of the modified record from the primary volume 104 does not align with an ending block of a record on the mirror volume 108. In one embodiment, the compare module 204 uses bits in a bitmap to determine the ending block or sector of a modified record.

The secondary storage system 106 includes, in one embodiment, an alert module 206 that generates an alert in response to the first block indicated by the start indicator not aligning with a beginning block of a record on the secondary storage system 106, as indicated in the track metadata. In the examples listed above, if the start indicator does not align with the beginning block of a record on the mirror volume 108 of the secondary storage system 106, the alert module generates an alert. In the above example where the start indicator indicates that a record starts at block 3 and the track metadata indicates that a record on the mirror volume 108 spans blocks 2-4, the alert module 206 would generate an alert.

In another embodiment, the alert module 206 generates an alert in response to the beginning sector of a modified received record or records, as indicated in a bitmap, not aligning with the beginning sector of a record on the secondary storage system 106, as indicated in a CRCB. In the example above where the bitmap sent with a received record indicates that the record includes sectors 3-7 and the CRCB of the track where the record is to be copied shows that record 1 occupies sectors 1-4, the alert module 206 recognizes that the received record does not correspond with the start of record 1 or record 2 and generates an alert. If, on the other hand, record 1 of the track on the mirror volume 108 occupies sectors 1 and 2 and record 2 starts at sector 3, the alert module 206 detects that the starting sector of the received record corresponds to the starting sector of record 2 and the alert module 206 does not generate an alert.

In one embodiment, the alert module 206 generates an alert in response to the ending block of the blocks to be modified on the secondary storage system 106, as indicated by the start indicator and the block indicator, not aligning with the ending block of a record on the secondary storage system 106, as indicated in the track metadata. If in the example above where the compare module 204 uses a start indicator and a block indicator to determine that a modified record ends at block 5 of the primary volume 104, and track metadata indicates a record on the mirror volume 108 spans blocks 3-6, the alert module 206 would generate an alert.

In one embodiment, the alert module 206 also generates an alert in response to the ending sector of the at least one record, as indicated in the bitmap, not aligning with the ending sector of a record on the secondary storage system 106, as indicated in the CRCB. In the example above where the bitmap sent with a received record indicates that the record includes sectors 3-7 and the CRCB of the track where the record is to be copied shows that record 2 occupies sectors 5-10, the alert module 206 recognizes that the received record does not correspond with the end of record 2 and generates an alert. If, on the other hand, record 2 of the track on the mirror volume 108 starts at sector 3 and ends at sector 7, the alert module 206 detects that the ending sector of the received record corresponds to the ending sector of record 2 and the alert module 206 does not generate an alert.

For a typical write command or similar command, the alert module 206 would typically generate an alert for misalignment at the beginning and ending of a modified record or group of records. For a write format command or similar command, where the command may alter the length of a record on the mirror volume 108, the alert module 206 would typically generate an alert for misalignment at the beginning of a modified record. Typically, the receive module 202 receives instructions or other computer code corresponding to a write command, write format command, or similar command along with the start indicator and block indicator (or bitmap). The receive module 202, in one embodiment, may also receive an update such as the modified record or group of records. The receive module 202, in another embodiment, may also receive an update in the form of a portion of a record.

In one embodiment, the receive module 202 may receive a write format command or a write format command in combination with another command such that one or more modified records are to be copied to a mirror volume 108, and blocks or sectors beyond the location where the modified records are to copied are erased by the write format command. For example, a modified record may be intended to be copied to sectors 3-7 while sectors 10 to the end of the irregular CKD track are to be erased. In this case, the receive module 202 may receive a start indicator communicating that the start of the modified record begins at sector 3 along with a block indicator communicating that the modified record occupies 5 sectors. In addition, the block indicator communicates that sectors 10 to the end of the track are to be erased. In one embodiment, the start indicator and block indicator may be in the form of a bitmap and the write format command may communicate the sectors to be erased. The alert module 206 may then determine if an alert is appropriate based on the start indicator, block indicator, and/or bitmap and input from the compare module 204. One of skill in the art will recognize other ways to use a bitmap, start indicator, or block indicator in conjunction with a write format command to both erase blocks or sectors and to generate an appropriate alert.

Note that in the case where a primary volume 104 differs from a mirror volume 108, a single modified record of the primary volume 104 may span multiple records of the mirror volume 108 and the beginning and ending of the modified record may align with the beginning and ending of the spanned records. Also, a group of modified records on the primary volume 104 may align with a differing group of records on the mirror volume 108. In such cases the alert module 206 may not generate an alert. However, typically an alert will be generated by a misalignment for some modified record for which a start indicator and block indicator (or bitmap) is received by the receive module 202 even if a small number of modified records don't generate an alarm. Beneficially, the invention of the apparatus 200 efficiently generates an alert for mismatched records caused by a primary volume 104 not being identical to a mirror volume 108.

Figure 3:
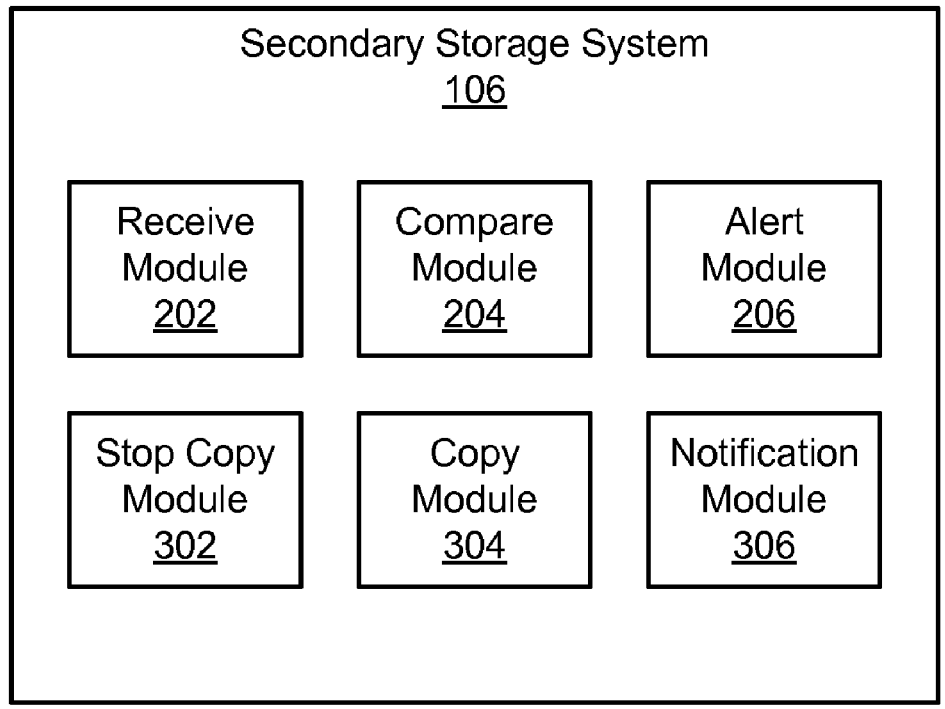
FIG. 3 is a schematic block diagram illustrating another embodiment of an apparatus associated with a secondary storage system to detect data mismatches in a mirror volume in accordance with the present invention.

FIG. 3 depicts another embodiment of an apparatus 300 associated with a secondary storage system 106 to detect data mismatches in a mirror volume 108 in accordance with the present invention. The apparatus 300 includes a secondary storage system 106 that includes a receive module 202, a compare module 204, and an alert module 206, which are substantially similar to the modules described in relation to the apparatus 200 depicted in FIG. 2. The secondary storage system 106 also includes, in one embodiment, a stop copy module 302, a copy module 304, and a notification module 306, which are described below.

The secondary storage system 106 includes, in one embodiment, a stop copy module 302 that stops copying records to a data storage device 118 in the secondary storage system 106 in response to an alert generated by the alert module 206. For example, if the alert module 206 detects a mismatch and generates an alert, the stop copy module 302 halts copying modified records to the mirror volume 108. The secondary storage system 106 includes, in one embodiment, a copy module 304 that copies the records received from the primary storage system 102 to a data storage device 118 in the secondary storage system 106. For example, if the alert module 206 does not detect a mismatch for a modified record corresponding to a start indicator or a block indicator received by the receive module 202, the copy module 304 copies the modified record to the mirror volume 108 at the location designated by the start indicator, bitmap, or other metadata accompanying the modified record. The location on the mirror volume 108 where the copy module 304 copies the modified records typically aligns to a corresponding location on the primary volume 104.

In one embodiment, the secondary storage system 106 includes a notification module 306 that sends a notification to the primary storage system 102 in response to an alert generated by the alert module 206. The notification sent by the notification module 306 includes a message to stop sending records to the secondary storage system 106. In one embodiment, the notification module 306 sends the notification to the primary storage controller 112. In another embodiment, the notification module 306 sends the notification to a server or other computer controlling a PPRC or other mirror data process.

In another embodiment, the notification module 306 generates an error message. The error message may be sent to the secondary storage controller 114, data mover, or other device in the secondary storage system 106 and may cause action in the secondary storage controller 114 or other device to halt an operation, alert an administrator, shut down a device, stop all read, write, copy, or other commands relating to the mirror volume 108, etc. One of skill in the art will recognize other notifications and errors that may be generated by an alert from the alert module 206.

Figure 4:
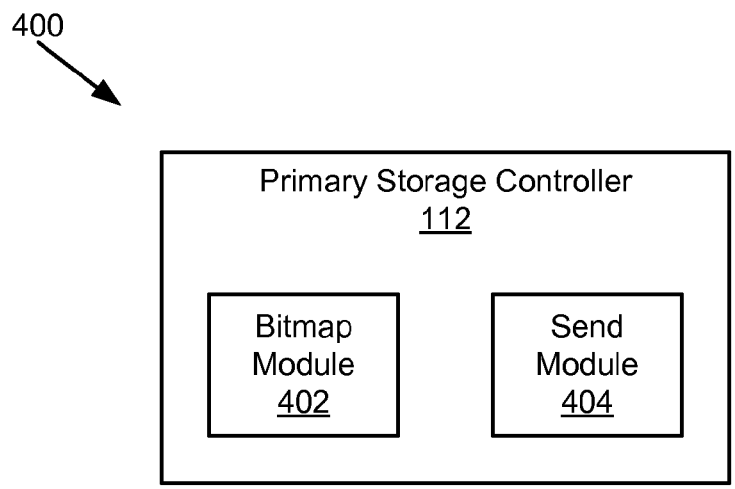
FIG. 4 is a schematic block diagram illustrating one embodiment of an apparatus associated with a primary storage system to detect data mismatches in a mirror volume in accordance with the present invention.

FIG. 4 depicts one embodiment of an apparatus 400 associated with a primary storage system 102 to detect data mismatches in a mirror volume 108 in accordance with the present invention. The apparatus 400, in one embodiment, includes a primary storage controller 112 that includes a bitmap module 402 and a send module 404, which are described below. In other embodiments, the apparatus 400 is included in another device or computer within the primary storage system 102 or in a computer or device in communication with the primary storage system 102.

The primary storage controller 112, in one embodiment, includes a bitmap module 402 that generates a bitmap comprising bits correlating to sectors occupied on the primary storage system 102 of at least one modified record intended to be copied or written to the secondary storage system 106. The primary and secondary storage systems 102, 106 each include at least one data storage device configured with irregular CKD tracks. Typically, the bitmap module 402 generates a bitmap with a bit for each sector in a track. In another embodiment, the bitmap module 402 generates a bitmap table where each row corresponds to a track and each column corresponds to a sector of a track. In another embodiment, the bitmap module 402 generates a start indicator and a block indicator corresponding to a modified record on the primary storage system 102.

In one embodiment, the bitmap module 402 generates a bitmap with a "one" in each of the bits that correspond to the sectors occupied by a record to be copied to the mirror volume 108 and "zeros" for all other bits of the bitmap. In another embodiment, the bitmap module 402 generates a bitmap with a "zero" in each of the bits that correspond to the sectors occupied by a record to be copied to the mirror volume 108 and "ones" for all other bits of the bitmap. In another embodiment, the bitmap module 402 generates a bitmap that includes metadata. The metadata may include track number, cylinder number, volume information, etc. One of skill in the art will recognize other ways that a bitmap module 402 may generate a bitmap that may be sent with a record and used to identify the sectors of a track occupied by the record on a primary volume 104. In another embodiment, the bitmap module 402 generates a start indicator that indicates a starting block of a modified record. In another embodiment, the bitmap module 402 generates a block indicator that indicates a number of blocks occupied by a modified record.

In one embodiment, the primary storage controller 112 includes a send module 404 that sends a bitmap to the secondary storage system 106. In another embodiment, the send module 404 sends and a copy of a corresponding modified record, metadata, a write command, a write format command, or other information with the bitmap. A comparison module 204 of the secondary storage system 106 then compares the sector locations indicated in the bitmap to corresponding sector locations listed in a CRCB on the secondary storage system 106. In another embodiment the compare module 404 compares a start indicator and a block indicator with track metadata.

An alert module 206 of the secondary storage system 106 generates an alert in response to the beginning sector of the modified records, as indicated in the bitmap, not aligning with the beginning sector of a record on the secondary storage system 106, as indicated in the CRCB. In one embodiment, the alert module 206 generates an alert in response to the ending sector of the at least one record, as indicated in the bitmap, not aligning with the ending sector of a record on the secondary storage system 106, as indicated in the CRCB. In another embodiment, the alert module 206 generates an alert in response to the first block indicated by the start indicator not aligning with a beginning block of a record on the secondary storage system, as indicated in the track metadata or in response to the ending block of the blocks to be modified on the secondary storage system 106, as indicated by the start indicator and the block indicator, not aligning with the ending block of a record on the secondary storage system 106, as indicated in the track metadata. In another embodiment, the primary storage system 106 stops sending copies of records to the secondary storage system 106 in response to receiving a record mismatch notification from a notification module 306 in the secondary storage system 106.

Figure 5:
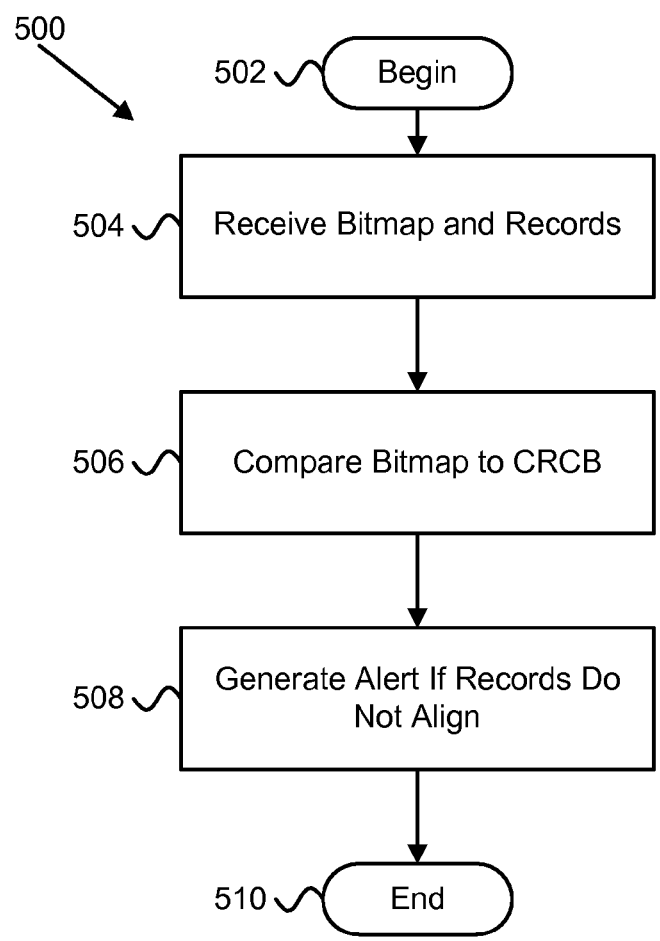
FIG. 5 is a schematic flow chart diagram illustrating one embodiment of a method associated with a secondary storage system for detecting data mismatches in a mirror volume in accordance with the present invention.

FIG. 5 is a schematic flow chart diagram illustrating one embodiment of a method 500 associated with a secondary storage system 106 for detecting data mismatches in a mirror volume 108 in accordance with the present invention. The method 500 begins 502 and the receive module 202 receives 504 at the secondary storage system 106 a bitmap from the primary storage system 102. The bitmap includes bits correlating to sectors occupied on the primary storage system 102 of a modified record. The primary and secondary storage systems 102, 106 each include at least one data storage device configured with irregular CKD tracks.

The compare module 204 compares 506 the sector locations indicated in the bitmap to corresponding sector locations listed in a CRCB on the secondary storage system 106. The CRCB describes a track where the modified record or records will be copied. The alert module 206 generates 508 an alert in response to the beginning sector of the modified records, as indicated in the bitmap, not aligning with the beginning sector of a record on the secondary storage system 106, as indicated in the CRCB and the method 500 ends 510. In another embodiment the alert module 206 generates 508 an alert in response to the ending sector of the modified records, as indicated in the bitmap, not aligning with the ending sector of a record on the secondary storage system, as indicated in the CRCB and the method 500 ends 510.

Figure 6:
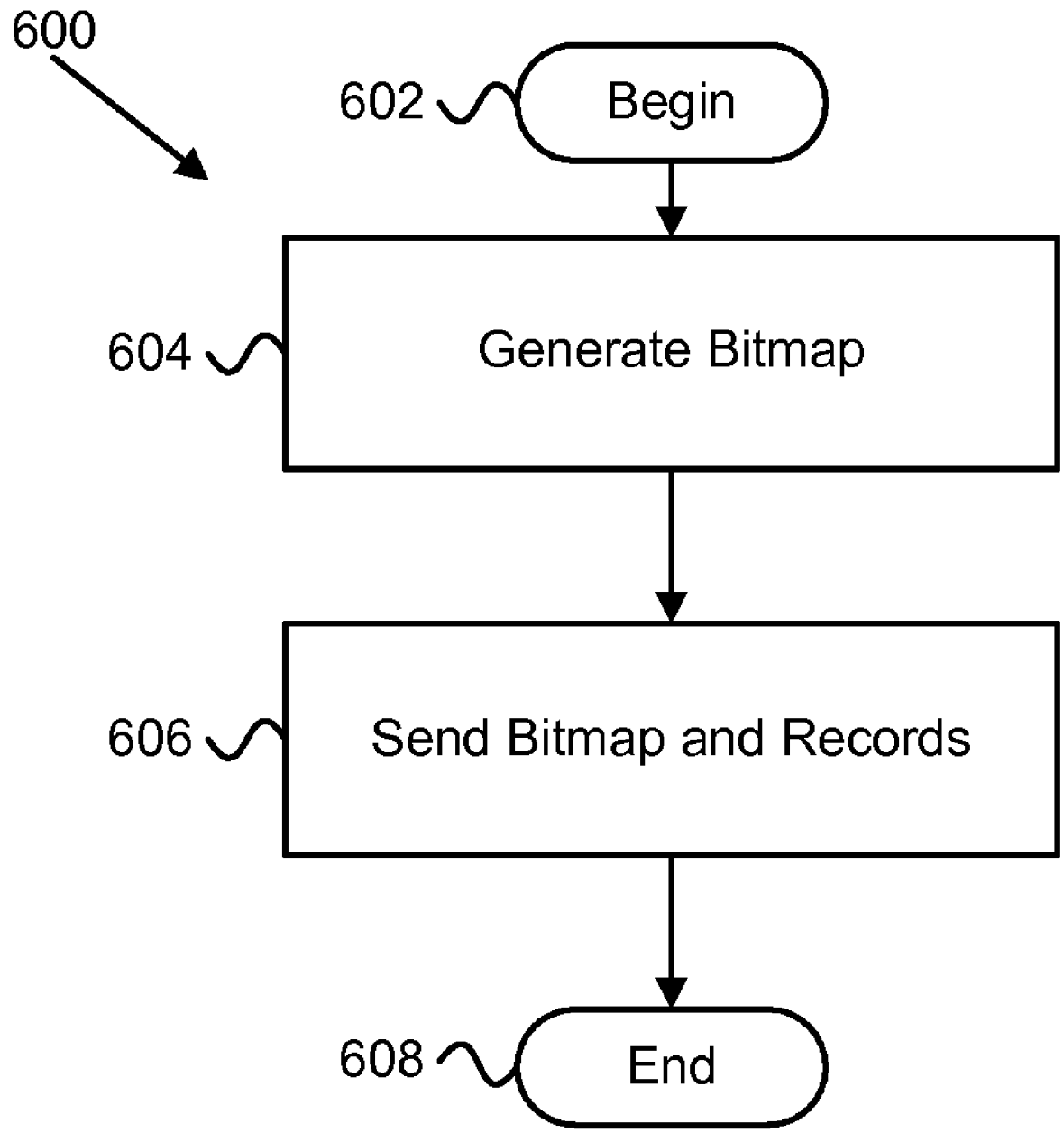
FIG. 6 is a schematic flow chart diagram illustrating one embodiment of a method associated with a primary storage system for detecting data mismatches in a mirror volume in accordance with the present invention.

FIG. 6 is a schematic flow chart diagram illustrating one embodiment of a method 600 associated with a primary storage system 102 for detecting data mismatches in a mirror volume 108 in accordance with the present invention. The method 600 begins 602 and the bitmap module 402 generates 604 a bitmap that includes bits correlating to sectors occupied on the primary storage system 102 of at least one record intended to be copied to the secondary storage system 106. In another embodiment, the bitmap module 402 generates 604 a start indicator and/or a block indicator. The primary and secondary storage systems 102, 106 each include at least one data storage device configured with irregular CKD tracks. The send module 404 sends 606 the bitmap or start indicator/block indicator to the secondary storage system 106 and the method 600 ends 608. In one embodiment, the send module 404 also sends 606 a copy of the modified record(s).

Figure 7:
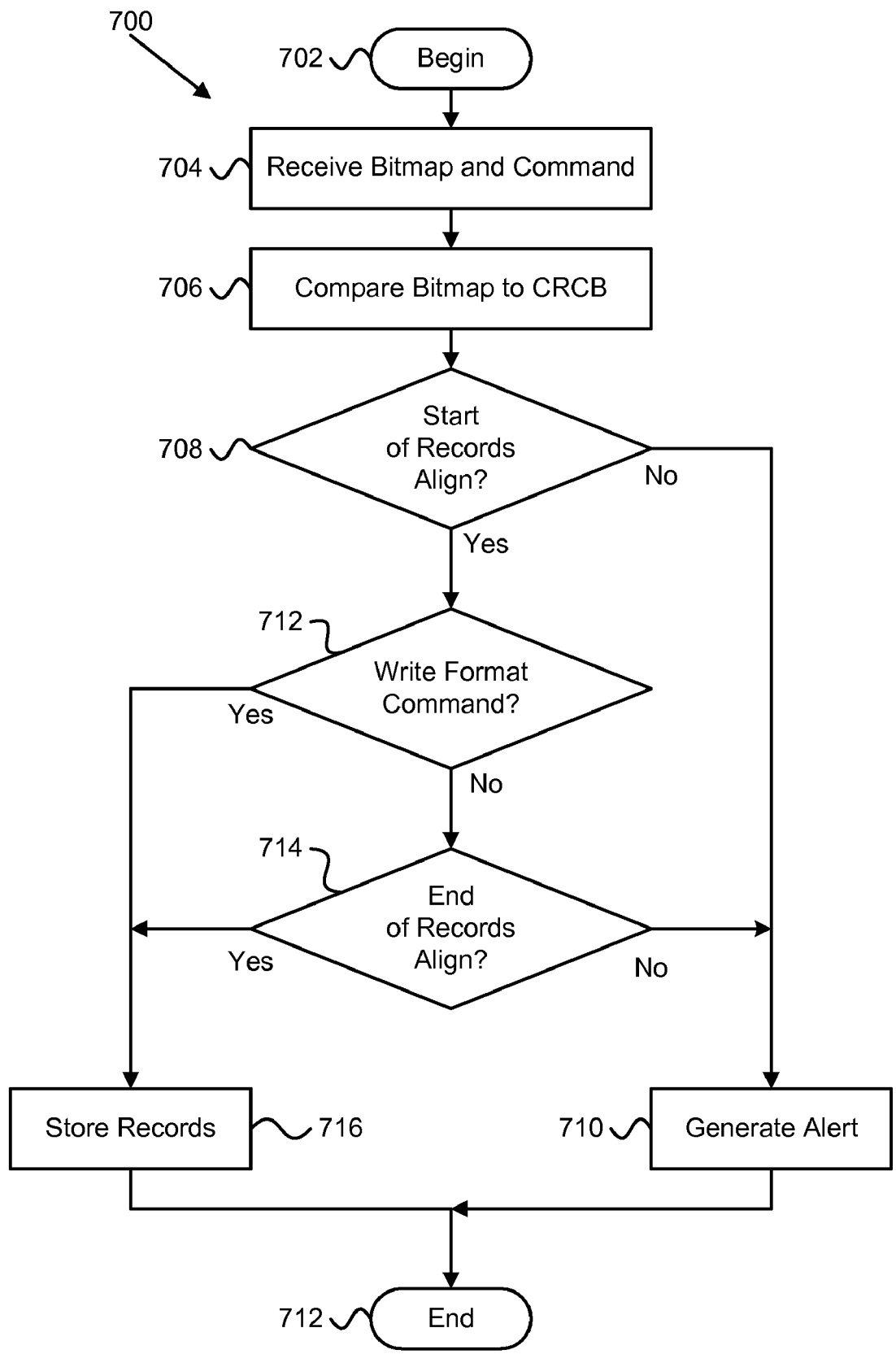
FIG. 7 is a schematic flow chart diagram illustrating a particular embodiment of a method associated with a secondary storage system for detecting data mismatches in a mirror volume in accordance with the present invention.

FIG. 7 is a schematic flow chart diagram illustrating a particular embodiment of a method 700 associated with a secondary storage system 106 for detecting data mismatches in a mirror volume 108 in accordance with the present invention. The method 700 begins 702 and the receive module 202 receives 704 a bitmap from the primary storage system 102. The bitmap corresponds to occupied sectors of a modified record on a primary storage system 102. The receive module 202 also receives 704 a command directing the mirror volume 108 and associated secondary storage controller 114 to store the modified record. The receive module 202 may also receive 704 a modified record or records.

The compare module 204 compares 706 the sector locations indicated in the bitmap to corresponding sector locations listed in a CRCB associated with a track on the mirror volume 108 of the secondary storage system 106 where the modified record is intended to be copied. The alert module 206 determines 708 if the beginning sectors of the modified record, as indicated in the bitmap, align with the beginning sector of a record in the mirror volume 108 of the secondary storage system 106. If the alert module 206 determines 708 that the beginning sectors do not align, the alert module 206 generates 710 an alert and the method 700 ends 712.

If the alert module 206 determines 708 that the beginning sectors align, the alert module 206 determines 712 if a command received by the receive module 202 and associated with the received bitmap and record(s) is a write format command or similar command. If the alert module 206 determines 712 that the received command is a write format or similar command, the copy module 304 stores 716 the record(s) to the mirror volume 108 of the secondary storage system 106 and the method 700 ends 712. When a write format command is associated with a received record, the write format command may change the size of the associated record(s) on the mirror volume 108 so the ending sectors need not be checked for alignment.

If the alert module 206 determines 712 that the command received by the receive module 202 is not a write format command, the alert module 206 determines 714 if the ending sector of the modified record(s), as indicated in the bitmap, align with the ending sectors of a record in the mirror volume 108 of the secondary storage system 106. If the alert module 206 determines 714 that the sectors align, the copy module 304 stores 716 the record(s) and the method 700 ends 712. If the alert module 206 determines 714 that the ending sectors do not align, the alert module 206 generates an alert 710 and the method 700 ends 712. Note that the method 700 may also be practiced with a start indicator and a block indicator instead of a bitmap and/or blocks instead of sectors.

Figure 8:
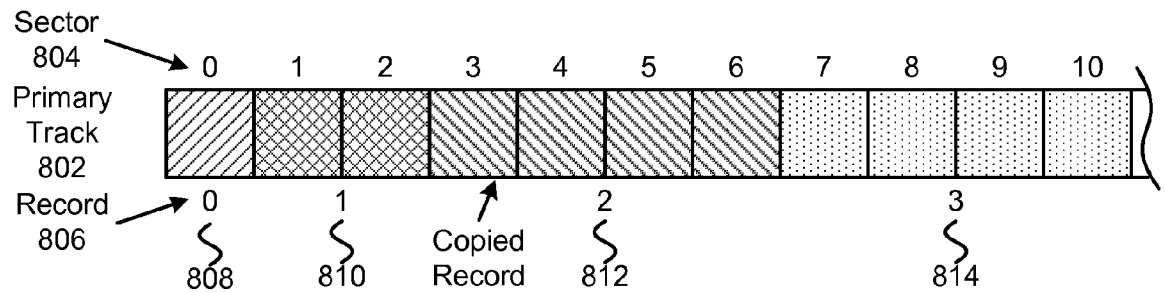
FIG. 8 is a block diagram illustrating a copied record and associated bitmap sent from a primary storage system and one example of corresponding sectors and an associated CRCB of a secondary storage system in accordance with the present invention.
Figure 8:
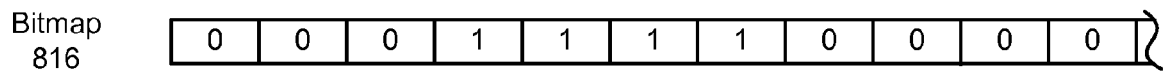
Figure 8:
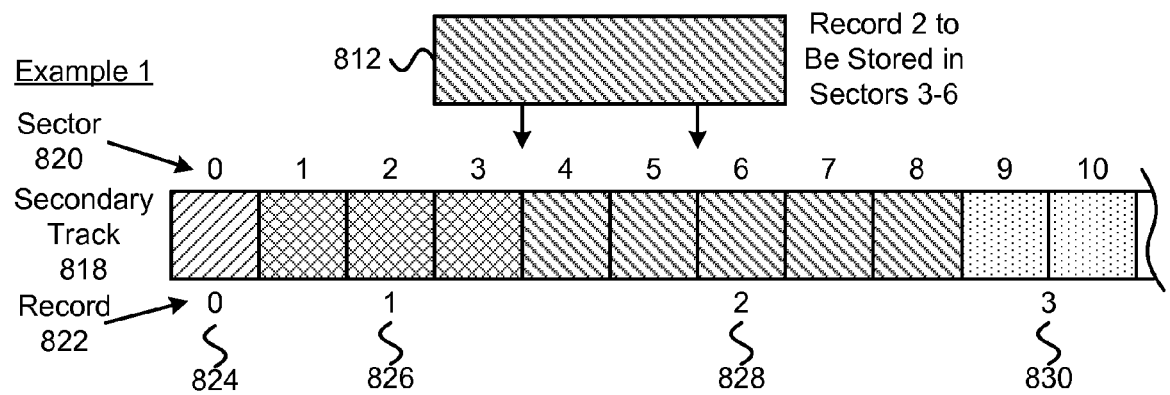

FIG. 8 is a block diagram illustrating a copied record and associated bitmap sent from a primary storage system 102 and one example of corresponding sectors and an associated CRCB of a secondary storage system 106 in accordance with the present invention. A primary track 802 from a primary volume 104 of a primary storage system 102 is shown divided into sectors 804 occupied by records 806. While sectors are shown, one of skill in the art would understand that other blocks may be used to divide a track, such as a group of sectors, a group of bytes, etc. The primary track 802 is intended to depict an irregular CKD track with variable length records 806. Record 0 808 typically starts at sector 0 and occupies a single sector. Record 0 is typically 48 bytes and resides on sector 0. Sector 0 includes an unused portion of that may be used to store a CRCB. Record 1 810 is depicted occupying sectors 1 and 2. Record 2 812 is depicted occupying sectors 3-6 and is designated as the record to be copied to the mirror volume 108. Record 3 814 is depicted occupying sectors 7-10. A bitmap 816 is shown that corresponds to record 2 812 that is copied to the mirror volume 108. The bitmap 816 has zeros for all bits except bits 3-6, which correspond to the sectors occupied on the primary volume 104 by record 2 812.

Example 1 depicts a secondary track 818 contained on a data storage device 116 that is part of a mirror volume 108 of the secondary storage system 106. The secondary track 818 is an irregular CKD track. The secondary track 818 is divided into sectors 820 containing records 822. Record 0 824 occupies a portion sector 0. The unused portion of sector 0 is used to store a CRCB for the secondary track 818. Record 1 826 occupies sectors 1-3, record 2 828 occupies sectors 4-8, and record 3 830 occupies sectors 9 and 10. Record 2 812 from the primary track 802 that is received by the receive module 202 along with the bitmap 816 is shown above sectors 3-6, where record 2 812 is intended to be copied. A CRCB 832 for the secondary track 818 is depicted in the form of a table. The CRCB 832 may be in any format that indicates record location and field sizes for records in an irregular CKD track. The CRCB 832 includes records in sequential order from record 1 826 to the n$^{th}$ record 834. Record 0 824 is not included because record 0 824 typically occupies only sector 0. The CRCB 832 includes the starting sector 836, key field size 838, and data field size 840. For convenience, the records of the secondary track 818 contain no key fields and the data field size 840 is depicted as a number of sectors. Record 1-3 826, 828, 830 are included and correspond to the illustration of the secondary track 818.

Once the receive module 202 has received the bitmap 816 from the primary storage system 102, the compare module 204 compares the bitmap 816 with the CRCB 832. In Example 1, modified record 2 812 starts at sector 3 of the secondary track 818, which is in the middle of record 1 826. The end of modified record 2 812 is at sector 6, which falls in the middle of record 2 828 of the secondary track 818. If modified record 2 812 is to be copied as part of a write format command, the start of modified record 2 812 would cause the alert module 206 to generate an alert. If modified record 2 812 is to be copied as part of a write command or similar command, the start and end of modified record 2 812 would cause the alert module 206 to generate an alert.

Figure 9:
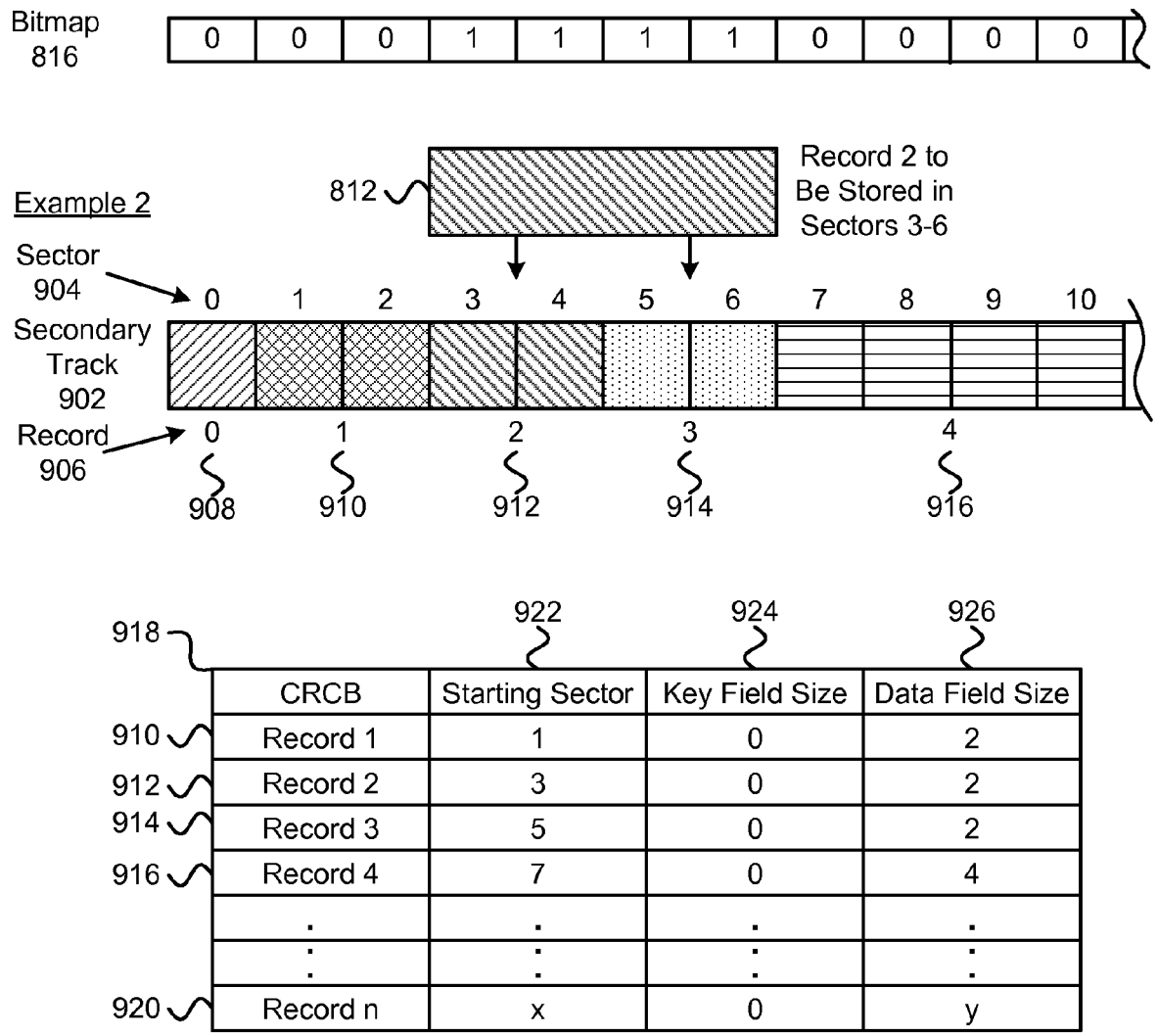
FIG. 9 is a block diagram illustrating a copied record and associated bitmap sent from a primary storage system and a second example of corresponding sectors and an associated CRCB of a secondary storage system in accordance with the present invention.

FIG. 9 is a block diagram illustrating a copied record and associated bitmap sent from a primary storage system 102 and another example of corresponding sectors and an associated CRCB of a secondary storage system 106 in accordance with the present invention. Example 2 includes record 2 812 and an associated bitmap 816 that are the same as illustrated in FIG. 8. Example 2 includes a different secondary track 902 divided into sectors 904 occupied by records 906. Again, record 0 908 occupies sector 0. Record 1 910 occupies sectors 1 and 2, record 2 912 occupies sectors 3 and 4, record 3 914 occupies sectors 5 and 6, and record 4 916 occupies sectors 7-10. A corresponding CRCB 918 for the secondary track 902 is shown and includes records 1 910 to the last record in the track, record n 920. The CRCB 918 depicts entries for records 1-4 910, 912, 914, 916 and shows the starting sector 922, key field size 924, and data field size 926. Again the key field size 924 for the records is zero and the data field size 926 is shown as a number of sectors occupied.

In example 2, the start of modified record 2 812 is at sector 3 and aligns with the start of record 2 912 of the secondary track 902. In addition, the end of modified record 2 812 is at sector 6 and aligns with the end of record 3 914 of the secondary track 902. In this example, comparing the received bitmap 816 and the CRCB 918 of the secondary track 902 would not generate an alert. However, example 2 typically does not occur very often for a mismatch between a primary volume 104 and a mirror volume 108 and other records sent from the primary storage system 102 would likely generate alerts.

Beneficially, the present invention provides a way to detect mismatches between data of a primary volume 104 and a corresponding mirror volume 108 where the volumes 104, 108 include irregular CKD tracks with variable-length records. The invention is more efficient than other possible methods to detect a mismatch, such as sending a CRCB. Beneficially, the alerts generated by the invention may be used to halt copying to a mirror volume 108 that is not an exact copy of a primary volume 104 and can prevent data corruption and time consuming, critical errors.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to detect mismatches in a mirror volume, the apparatus comprising:

a receive module configured to receive at a secondary storage system a start indicator from a primary storage system, the start indicator comprising an indication of a location of a first block to be modified on a track of a data storage device in the secondary storage system, the first block of the secondary storage system corresponding to an identically located first block of at least one modified record on a track of a data storage device in the primary storage system, wherein the tracks on the primary and secondary storage systems each comprise irregular count key data ("CKD") tracks;

a compare module configured to compare the first block location indicated by the start indicator with block locations listed in track metadata, wherein the track metadata describes lengths and locations of user records on the irregular CKD tracks of the secondary storage system; and an alert module configured to generate an alert in response to the first block indicated by the start indicator not aligning with a beginning block of a record on the secondary storage system, as indicated in the track metadata.

2. The apparatus of claim 1, wherein
the receive module further receives a block indicator from the primary storage system, the block indicator comprising a quantity of blocks occupied by the at least one modified record of the primary storage system corresponding to an identical location of blocks on the secondary storage system to be modified;
the compare module further compares blocks to be modified on the secondary storage system, as indicated by the start indicator and the block indicator, with block locations listed in the track metadata; and
the alert module further generates an alert in response to the ending block of the blocks to be modified on the secondary storage system, as indicated by the start indicator and the block indicator, not aligning with the ending block of a record on the secondary storage system, as indicated in the track metadata.

3. The apparatus of claim 2, wherein the start indicator and the block indicator comprise a bitmap.

4. The apparatus of claim 2, wherein the quantity of blocks indicated by the block indicator further represents locations and quantities of non-contiguous blocks on the track of the data storage device of the secondary storage system corresponding to block locations for a plurality of modified records on the primary storage system to be copied to the secondary storage system, wherein the modified records are non-sequential.

5. The apparatus of claim 1, further comprising a copy module configured to copy the at least one modified record on the primary storage system to an identical location on the secondary storage system in response to the alert module not generating an alert for a received start indicator corresponding to the modified records.

6. The apparatus of claim 1, wherein a block comprises one of a sector, a cluster of sectors, a group of bytes, and a group of bits.

7. The apparatus of claim 1, wherein the track metadata comprises a cache record control block ("CRCB").

8. The apparatus of claim 1, further comprising a stop copy module configured to stop copying records to the data storage device in the secondary storage system in response to an alert generated by the alert module.

9. The apparatus of claim 1, further comprising a notification module configured to send a notification to the primary storage system in response to the alert, the notification comprising a message to stop sending records to the secondary storage system.

10. The apparatus of claim 1, wherein the secondary storage system is configured to store a minor copy of data on a data storage device of the primary storage system.

11. A system to detect mismatches in a mirror volume, the system comprising:
a computer network;
a primary storage system comprising at least one data storage device configured with irregular count key data ("CKD") tracks; and
a secondary storage system in communication with the primary storage system over the computer network, the secondary storage system configured to store a minor copy of data on a data storage device of the primary storage system and comprising at least one data storage device configured with irregular CKD tracks, the secondary storage system comprising
a receive module configured to receive at the secondary storage system a start indicator from the primary storage system, the start indicator comprising an indication of a location of a first block to be modified on a track of a data storage device with irregular CKD tracks in the secondary storage system, the first block of the secondary storage system corresponding to an identically located first block of at least one modified record on a track of a data storage device with irregular CKD tracks in the primary storage system;
a compare module configured to compare the first block location indicated by the start indicator with block locations listed in track metadata, wherein the track metadata describes lengths and locations of user records on the irregular CKD tracks of the secondary storage system; and
an alert module configured to generate an alert in response to the first block indicated by the start indicator not aligning with a beginning block of a record on the secondary storage system, as indicated in the track metadata.

12. The system of claim 11, wherein
the receive module further receives a block indicator from the primary storage system, the block indicator comprising a quantity of blocks occupied by the at least one modified record of the primary system corresponding to an identical location of blocks on the secondary storage system to be modified;
the compare module further compares blocks to be modified on the secondary storage system, as indicated by the start indicator and the block indicator, with block locations listed in the track metadata; and
the alert module further generates an alert in response to the ending block of the blocks to be modified on the secondary storage system, as indicated by the start indicator and the block indicator, not aligning with the ending block of a record on the secondary storage system, as indicated in the track metadata.

13. The system of claim 11, wherein the primary and secondary storage systems are part of a peer-to-peer remote copy ("PPRC") system.

14. A computer program product comprising a computer readable storage medium having computer usable program code programmed for detecting mismatches in a minor volume, the operations of the computer program product comprising:
receiving at a secondary storage system a bitmap from a primary storage system, the bitmap comprising bits correlating to sectors of at least one modified record on an irregular count key data ("CKD") track on the primary storage system, the at least one modified record intended to be copied to an identical location on a corresponding irregular CKD track on the secondary storage system;
comparing the sector locations indicated in the bitmap to corresponding sector locations listed in a cache record control block ("CRCB") on the secondary storage system; and
generating an alert in response to the beginning sector of the at least one record, as indicated in the bitmap, not aligning with the beginning sector of a record on the secondary storage system, as indicated in the CRCB.

15. The computer program product of claim 14, further comprising generating an alert in response to an ending sector of the at least one record, as indicated in the bitmap, not aligning with an ending sector of a record on the secondary storage system, as indicated in the CRCB.

16. The computer program product of claim 14, further comprising receiving a bitmap containing zeros and a staffing sector location in an irregular CKD track as part of a write format command that erases data from the starting sector to the end of the track and wherein comparing the sector locations indicated in the bitmap to corresponding sector locations listed in the CRCB comprises comparing the starting sector location to corresponding sector locations in the CRCB and wherein generating an alert comprises generating an alert in response to the starting sector not aligning with a beginning sector of a record on the secondary storage system, as indicated in the CRCB.

17. The computer program product of claim 14, further comprising generating an error in response to the alert.

18. A method for detecting mismatches in a mirror volume, the method comprising:
   generating a bitmap comprising bits correlating to sectors occupied by at least one record on an irregular count key data ("CKD") track on a primary storage system, the at least one record intended to be copied to an identical location on an irregular CKD track of a secondary storage system;
   sending the bitmap to the secondary storage system, the secondary storage system configured
   to compare the sector locations indicated in the bitmap to corresponding sector locations listed in a cache record control block ("CRCB") on the secondary storage system; and
   to generate an alert in response to a beginning sector of the at least one record, as indicated in the bitmap, not aligning with a beginning sector of a record on the secondary storage system, as indicated in the CRCB.

19. The method of claim 18, wherein the secondary storage system is further configured to generate an alert in response to an ending sector of the at least one record, as indicated in the bitmap, not aligning with an ending sector of a record on the secondary storage system, as indicated in the CRCB.

20. The method of claim 18, further comprising stopping sending copies of records to the secondary storage system in response to receiving an alert from the secondary storage system.

* * * * *